United States Patent
Johnson et al.

(10) Patent No.: US 6,917,993 B2
(45) Date of Patent: Jul. 12, 2005

(54) MODULAR STORAGE LIBRARY WITH AUTOMATIC CONFIGURATION

(75) Inventors: Kristianne Emma Johnson, Fort Collins, CO (US); Daniel Joseph Peterson, Ault, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 189 days.

(21) Appl. No.: 10/445,072

(22) Filed: May 23, 2003

(65) Prior Publication Data

US 2004/0254647 A1 Dec. 16, 2004

(51) Int. Cl.⁷ .............................................. G06F 13/00
(52) U.S. Cl. ...................... 710/74; 711/111; 369/30.06; 369/30.38; 369/42; 369/53; 369/92
(58) Field of Search ............. 711/111–114; 710/72–74, 710/5; 369/30.05–30.09, 30.1, 30.38–30.42, 30.53–30.54, 30.64–30.86, 92, 2; 700/90

(56) References Cited

U.S. PATENT DOCUMENTS

| | | | |
|---|---|---|---|
| 6,034,928 A | 3/2000 | Inoue | |
| 6,085,975 A | 7/2000 | Irvine et al. | |
| 6,131,129 A | * 10/2000 | Ludtke et al. | 710/5 |
| 6,222,699 B1 | 4/2001 | Luffel et al. | |
| 6,231,291 B1 | 5/2001 | Mueller et al. | |
| 6,321,219 B1 | 11/2001 | Gainer et al. | |
| 6,335,861 B1 | 1/2002 | Ramsey, III et al. | |
| 6,336,016 B1 | * 1/2002 | Ikeda | 399/107 |
| 6,426,922 B1 | * 7/2002 | Machida et al. | 369/2 |
| 6,438,648 B1 | * 8/2002 | McKean et al. | 711/114 |
| 6,633,954 B1 | * 10/2003 | Don et al. | 711/114 |
| 6,792,323 B2 | * 9/2004 | Krzyzanowski et al. | 700/90 |
| 2002/0145846 A1 | 10/2002 | Helot et al. | |

FOREIGN PATENT DOCUMENTS

JP  2002163851 A  * 6/2002  ........... G11B/17/22

* cited by examiner

Primary Examiner—Christopher B. Shin

(57) ABSTRACT

A modular storage system comprises one or more storage modules, a moveable display capable of coupling to a storage module, and a sensor capable of detecting movement of the display. The individual storage modules have one or more magazines that can hold a plurality of storage cartridges. The modular storage system further comprises a controller that responds to detected display movement by reconfiguring a state of the modular storage system.

20 Claims, 9 Drawing Sheets

MODULAR STORAGE LIBRARY WITH AUTOMATIC CONFIGURATION

BACKGROUND OF THE INVENTION

Data storage systems are used to store large volumes of information. As the quantity of information requiring storage continues to increase at unprecedented rates, predicting future storage needs and managing storage infrastructure costs are difficult problems. Accordingly, data storage systems use various techniques to regularly scale up capacity, throughput, and availability of data while reducing system downtime.

Some data storage systems store a plurality of data cartridges in slots within one or more drawers. Such data storage systems include media storage systems or autochangers to automatically change data cartridges in a cartridge reader in response to commands from a controller, enabling access to multiple data cartridges without having to manually position each cartridge in a reader. An autochanger may include one or more different types of cartridge-receiving devices capable of holding cartridges of different sizes and form factors.

These media data storage systems include one or more storage racks or magazines arranged in drawers, rows, or other configurations that supply storage locations for the data cartridges. The data storage system commonly includes one or more cartridge read/write devices to access and store data on the cartridges. Although various operational modes are possible, systems commonly have the read/write device in a fixed location and use a moveable cartridge picker assembly to transport data cartridges between storage racks or magazines and the cartridge read/write devices. The cartridge picker can have a plunge mechanism that engages a data cartridge held within the rack or magazine and withdraws the data cartridge. The data storage system also can include a picker positioner that moves the cartridge picker assembly along the rack for transporting the cartridges between the read/write devices and the racks.

Data storage systems can have a controller, such as a host computer system, central processing unit (CPU), microcontroller, microprocessor, state machine, or other type of processor that manages data access and storage. The controller commonly controls functions of the read/write device and other operational elements of a data storage system.

For example, during operation the controller can issue a request for data contained on a particular data cartridge. A control system associated with the data storage system can actuate the picker positioner to move the picker assembly along the cartridge storage racks until positioned adjacent the selected cartridge. The control system then actuates the plunge mechanism to move the data cartridge from the storage rack to the picker assembly, and moves the picker assembly to a cartridge read/write device. Once properly positioned adjacent the read/write device, the plunge mechanism may insert the cartridge into the read/write device for reading or writing of data. When the operation is complete, the control system can actuate the plunge mechanism to remove the cartridge from the read/write device and return the cartridge to the appropriate location in the storage rack.

Some data storage systems may be configured as scaleable, modular units in which multiple autochanger modules, each having one or more read/write devices for example, can be connected to incrementally expand the total system storage capacity. In some configurations, multiple autochanger modules can be interconnected in a vertical stack. In a particular example, multiple autochanger modules may use a single picker assembly that can move vertically between the autochanger modules as well as horizontally within a single autochanger module. In this manner, the picker assembly may access a data cartridge from any autochanger module and access data from the cartridge from any read/write device in the stack of autochanger modules. Usage of a stack of autochanger modules increases total storage and the total number of cartridge read/write devices that can be simultaneously accessed.

In comparison to multiple individual autochangers connected over a network, a stacked autochanger configuration reduces cost since resources can be reduced to a single picker mechanism and a single housing. Similarly, a controller can perform all management functions by addressing a single device rather than multiple devices, enabling all read/write devices in the stack access to any data cartridge from any level.

A data storage system may use a mailslot for accessing data cartridges. The mailslot is a set of one or more slots allocated for accessing data cartridges. Typically, the mailslot resides at a fixed location in a data storage system. In one example, the mailslot resides at the top level of an autochanger. For a large data storage library, a mailslot at the top level is nonergonomic and may require a user to strain to reach mailslot cartridges. In some cases, a user or administrator may wish to change the location of a mailslot to a more convenient location. Some systems do not allow movement of the mailslot to a more suitable location. Other systems may allow configuration to change the location of the mailslot but the configuration process typically is time consuming and inconvenient, and a user may forget or be uncertain as to the mailslot position.

SUMMARY OF THE INVENTION

In accordance with some embodiments, a modular storage system comprises one or more storage modules, a moveable display capable of coupling to a storage module, and a sensor capable of detecting movement of the display. The individual storage modules have one or more magazines that can hold a plurality of storage cartridges. The modular storage system further comprises a controller that responds to detected display movement by reconfiguring a state of the modular storage system.

In accordance with other embodiments, a storage system comprises one or more storage modules, a display capable of detachment and attachment to the one or more storage modules, and a controller. The individual storage modules have one or more magazines that can hold a plurality of storage cartridges. The controller is capable of managing one or more storage slots in a storage module of the one or more storage modules as a mailslot that controls access to the storage cartridges. The controller can respond to a change in display attachment by initiating mailslot configuration.

In accordance with further embodiments, a method of operating a storage system comprises defining a mailslot as one or more data cartridge slots in a storage module of a multiple-module data storage system, and managing access to data cartridges in the mailslot. The method further includes detecting a change in attachment of a display connectable to a storage module in the multiple-module data storage system, and responding to a detected change in display attachment by initiating mailslot reconfiguration.

BRIEF DESCRIPTION OF THE DRAWINGS

Embodiments of the invention relating to both structure and method of operation, may best be understood by referring to the following description and accompanying drawings.

DETAILED DESCRIPTION

What is desirable is an apparatus and method that enable and facilitate configuration of a mailslot.

Figure 1:
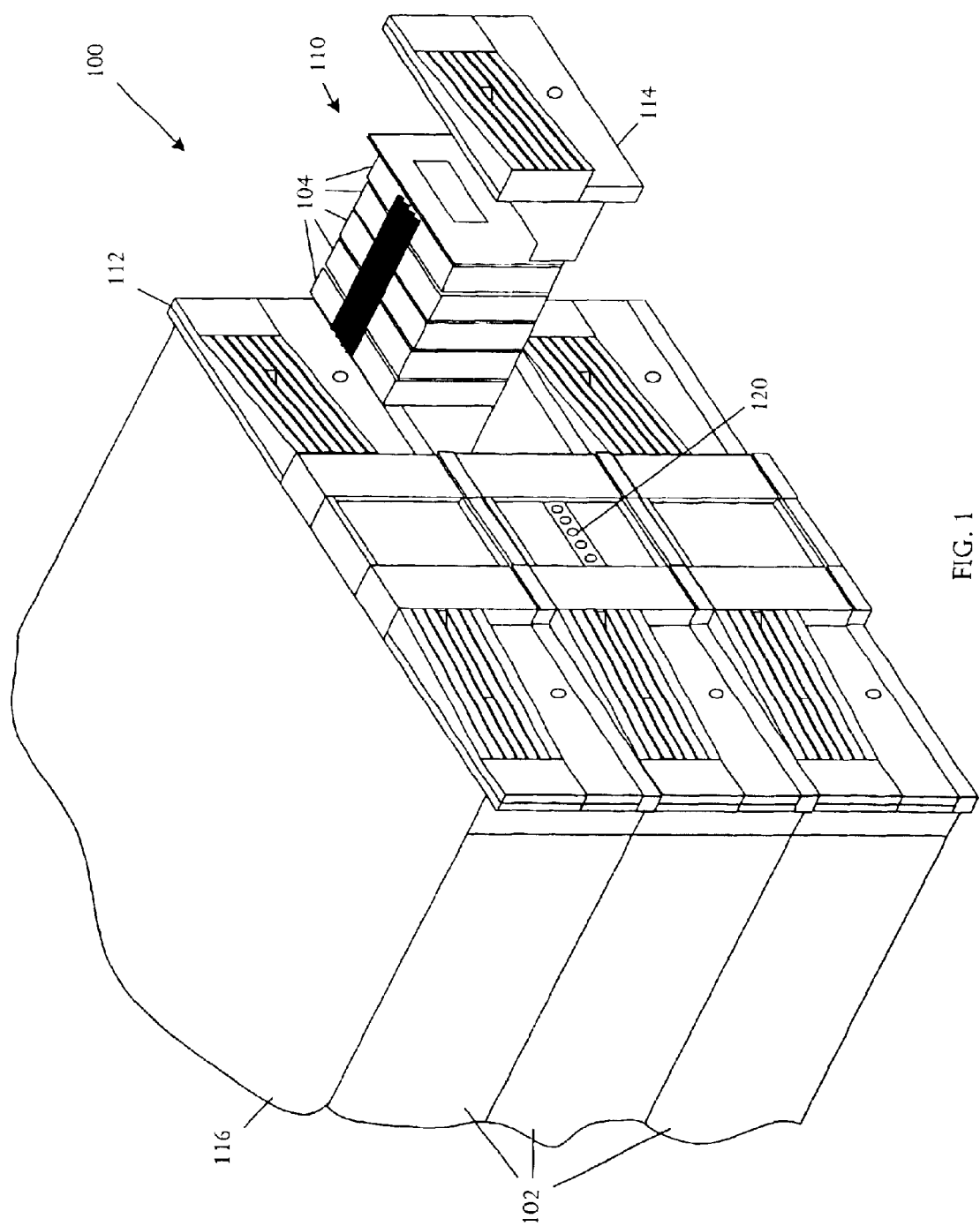
FIG. 1 is a three-dimensional pictorial diagram illustrating a media storage library system with a Mailslot selected in multiple vertically stacked media storage modules.

Referring to FIG. 1, a three-dimensional pictorial diagram shows a media storage library system 100 with a Mailslot 110 selected in multiple vertically stacked media storage modules 102. The Mailslot 110 facilitates controlled movement of data cartridges 104 into and out of the media storage library 100. Mailslot locations defined to be mutually exclusive of storage locations. Consequently, configuration of a larger mailslot decreases the number of available storage locations in the media storage library 100.

In some embodiments, a default location of the Mailslot 110 can be the upper right-hand drawer 112 in the media storage library 100. In the illustrative configuration, an administrator has selected the mid-level right-hand drawer 114 to hold the Mailslot 110.

When a data cartridge 104 is changed, a controller (see 610 in FIG. 6) controls the mailslot drawer 114 to open to the number of slots of the selected configuration. In an automatic system, the controller may control a drawer transport mechanism (see 650 in FIG. 6) to withdraw from a cabinet 116 a sufficient distance to access the selected number of slots. In a manual system, the controller may extend a tab or locking member at a position in the drawer 114 that prevents withdrawal of the drawer 114 beyond the number of slots in the Mailslot 110.

In an illustrative system, the default configuration is a single-slot Mailslot 110. An administrator can otherwise configure the Mailslot 110 for no mailslot, one mailslot, one magazine, or two magazines from the Administration or Service menus. Other embodiments may allow other numbers of mailslots although the mailslots are confined to a single media storage module.

When the configuration specifies no mailslots, magazine access is used to exchange data cartridges 104, allowing all slots to be used for data storage, but not allowing simple removal or addition of cartridges without an inventory check.

A mailslot setting of one designates one slot for mailslot usage so that the mailslot drawer 114 opens to the single slot, facilitating a manual cartridge exchange procedure. A single mailslot reduces the storage capacity by one slot, but extends the time to import and export multiple cartridges.

A mailslot configuration of one magazine designates an entire magazine as the mailslot, simplifying exchange of multiple cartridges but reducing data storage by the entire magazine. A two magazine mailslot configuration also simplifies exchange of multiple cartridges and facilitates exchange of separate cartridge types for a library that includes drives of multiple different technologies. However, the two-magazine mailslot diminishes the overall storage by two magazines.

An administrator configures the Mailslot by entering the Main Menu and selecting Administration. From the Administration Menu, the administrator selects the Change Configuration Menu, then selects Mailslot. Before changing the configuration, the administrator should verify that slots to be defined as the Mailslot are empty and not the original location of a cartridge in a drive. In some embodiments, software or firmware upon entry of the desired Mailslot locations can check the selected slot(s) to determine whether a cartridge is within the location. In some examples, the software or firmware can upon determination that a slot is not empty read or attempt to read a bar code of the cartridge within the slot.

In the Configure Mailslot menu, a message can be posted to remind the administrator to check the storage slot and mailslot configuration in backup software. Upon entry of an affirmative reply to continue, the next screen describes prerequisites for mailslot configuration. The administrator verifies the prerequisites and enters an affirmative reply to continue, causing a next screen that indicates the current mailslot configuration. The administrator selects the number of mailslots desired, for example no slots, one slot, one magazine, or two magazines. Upon selection, a confirmation screen automatically displays success or failure of the change and reminds the administrator to configure backup software. The administrator then can exit the mailslot configuration menu with an appropriate command.

The media storage library system 100 is a data storage system configured in the form of one or more stackable modules 102 that allow customers to select and modify library capacity. The media storage library system 100 has a user interface 120 that displays status information and enables user-actuated operations and requests. The user interface 120 is typically in the form of a display panel that attaches to a module 102. In some embodiments, the display panel 120 is moveable and allows a user or administrator to select a convenient level in a module stack for attachment. The media storage library system 100 has a Mailslot 110, defined as one or more data cartridge slots allocated for accessing data cartridges in the system. The media storage library system 100 comprises a sensor capable of detecting the level at which the display 120 is attached and a controller capable of responding to detection of a change in display attachment level by automatically configuring the Mailslot 110 at the display attachment level. If the display 120 is moved to a different level, the Mailslot 110 automatically follows. In some embodiments, the user or administrator can override the automatic mailslot configuration.

In some examples, the media storage library system 100 comprises one or more data storage modules 102 that can be stacked into an arrangement of one or more levels. The individual data storage modules 102 have a plurality of slots for storing data storage cartridges. One or more slots on one level of the data storage module stack can be configured as a Mailslot 110 that enables access to data cartridges stored in the data storage system. The media storage library system 100 also comprises a display 120 that is moveable and can be mounted on one of the data storage modules 102, and a sensor that detects attachment of the display to a data storage module 102. The media storage library system 100 further comprises a controller that responds to sensor detection by configuring the Mailslot 110 on the level of the display 120. If the display is moved, the controller automatically reconfigures the Mailslot 110 to the display level. Automatic configuration of the Mailslot 110 to the display level positions the Mailslot 110 at a convenient level as selected by the user.

By automatically configuring the Mailslot 110 to the display level, the Mailslot 110 is conveniently positioned in close proximity to the display, confirming the Mailslot 110 location and efficiently positioning the Mailslot 110. In some embodiments, data cartridges in the Mailslot 110 are accessible only through the display 120 so automatic configuration positions the Mailslot 110 in the most convenient position for the user.

Figure 2:
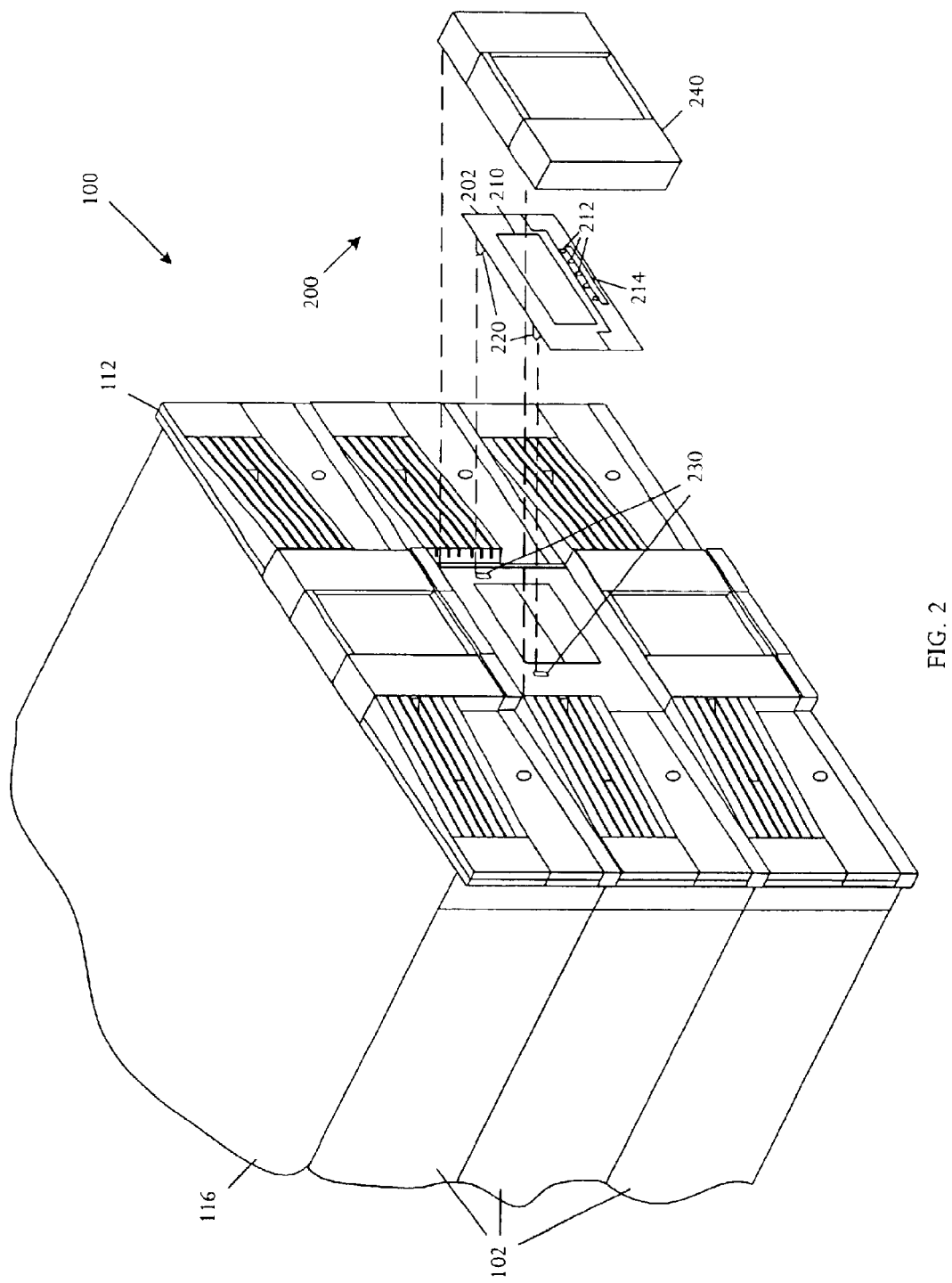
FIG. 2 is a three-dimensional pictorial diagram that shows a user interface for the media storage library system.

Referring to FIG. 2, a three-dimensional pictorial diagram shows a user interface 200 for the media storage library system 100. The user interface 200 includes a front panel display 202 with a display screen 210, light-emitting diodes 212, and a light bar 214. The front panel display 202 has tabs 220 for connecting to attachment apertures 230 in a data storage module 102. A viewing window 240 connects to the front surface of the data storage module 102 over the front panel display 202.

Figure 3A:
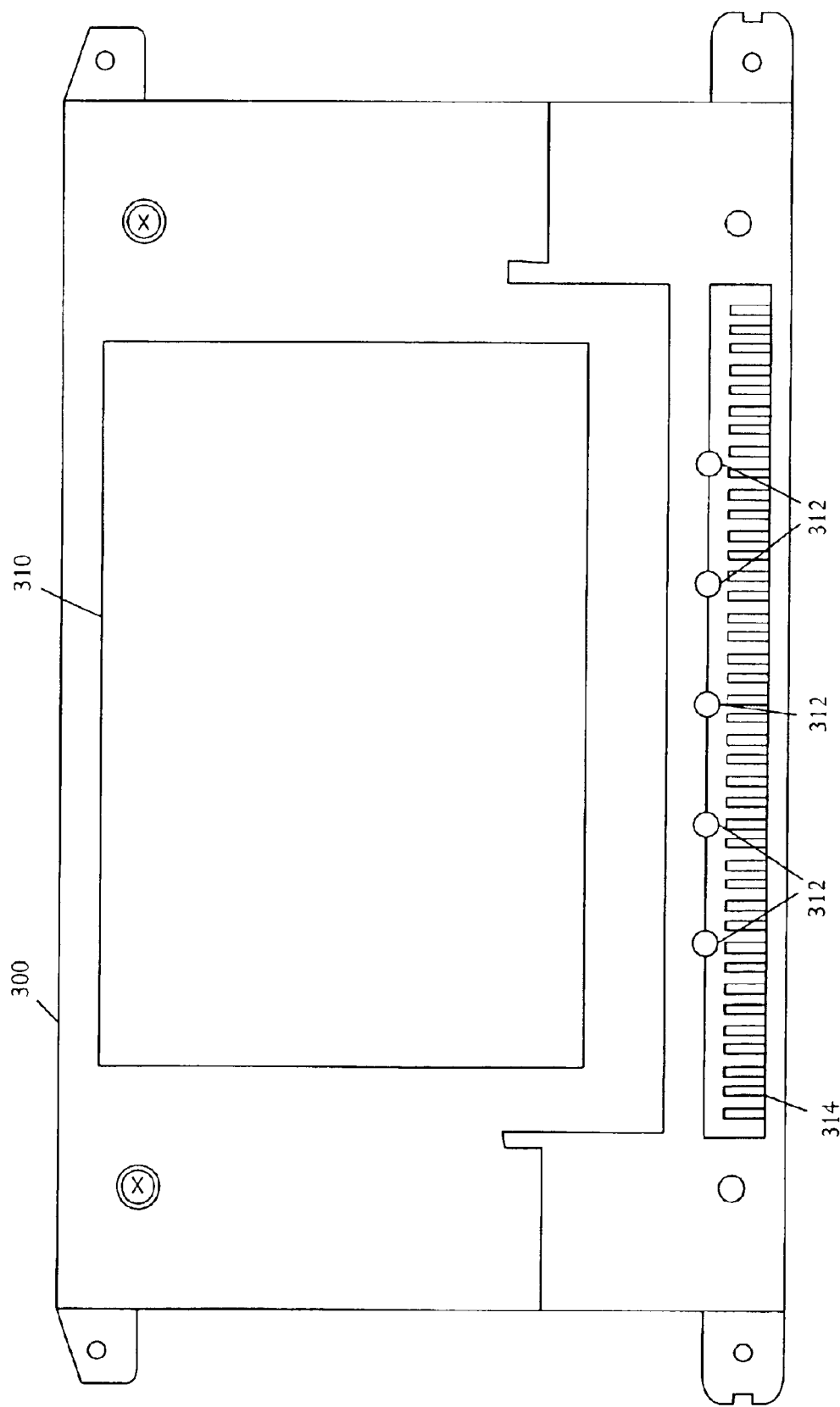
FIGS. 3A and 3B are pictorial diagrams showing a frontal view and a rear view, respectively, of an example of a suitable moveable display for usage with a media storage library.
Figure 3B:
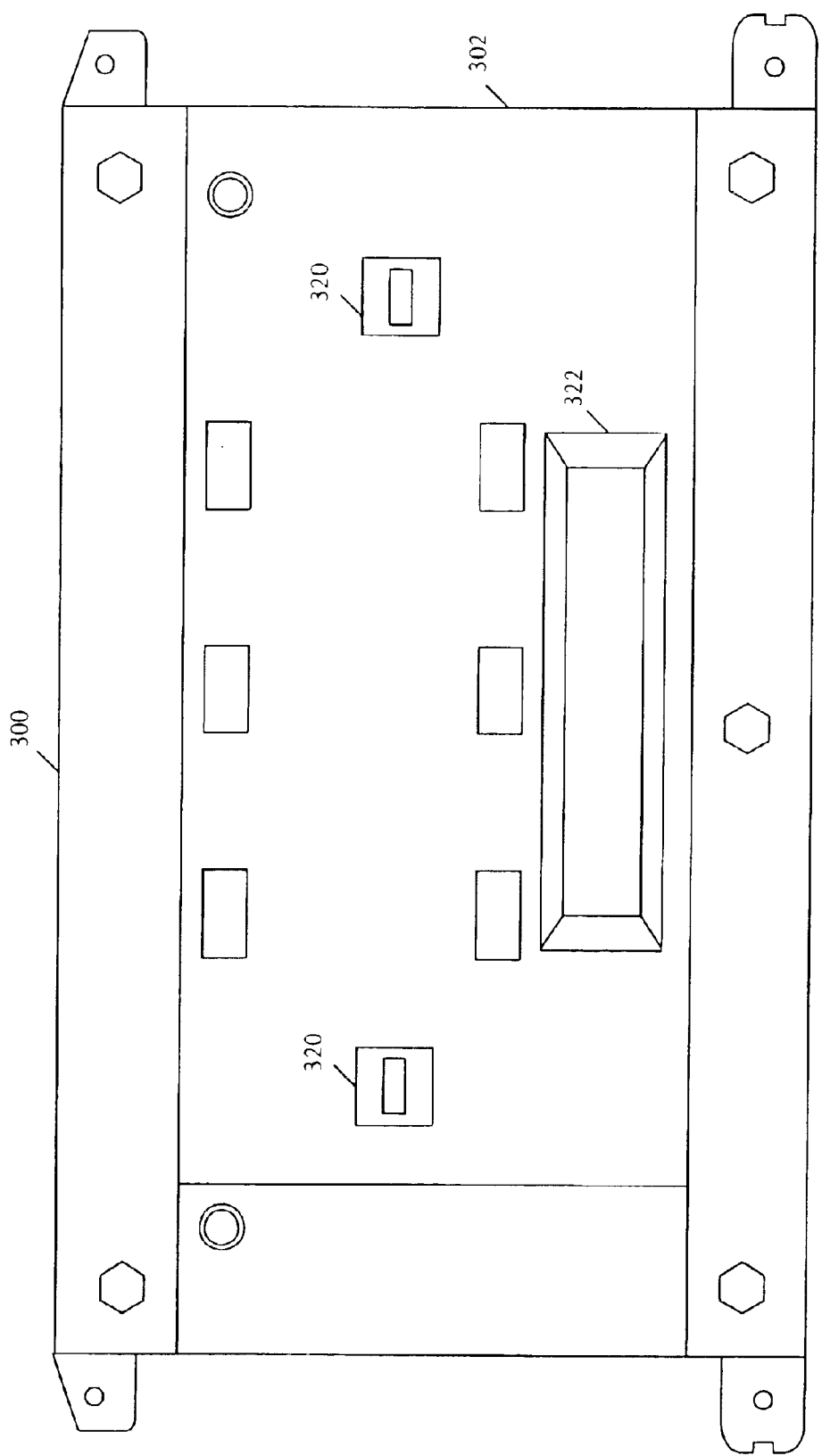

Referring to FIGS. 3A and 3B, pictorial diagrams show frontal and rear views of an example of a suitable moveable display 300 for usage with a media storage library. A modular storage library can be configured in multiple arrangements in various different sizes. The administrators or users who accesses storage cartridges in the library typically are different sizes and have varying strengths and physical capabilities. For more ergonomic usage of the storage library, the display 300 is moveable to allow the administrator or user to attach the display 100 to any desired module in the library.

The moveable display 300 has a display screen 310, light-emitting diodes (LEDs) 312, and a light bar 314 to communicate information to a user. The rear panel 302 of the display 300 has tabs 320, for example plastic tabs, which can be inserted into attachment apertures on the face of the modules. The tabs 320 can be in the form of plastic fingers that align the display 300 and connect the display 300 in place on a storage module, for example in the manner a cabinet drawer connects to a latch. The rear panel 302 has a bus connector 322 that connects the display screen 310 and LEDs 312 to a bus in the individual storage modules.

In some embodiments, the bus connector 322 upon connection to a bus internal to a storage library may function as a sensor capable of sensing connection and disconnection of the display 300 from the library. Connection of the bus connector 322 to the bus may generate an interrupt for detecting connection of the front panel display 300. Other embodiments may use other types of sensors, such as mechanical or electromechanical switches, optical sensors, and various other types of suitable sensing devices or components.

A user can move the display 300 by simply grasping the display 300 and removing the tabs 320 from the attachment apertures. The entire display 300 is removed, including display screen 310 and LEDs 312. A storage library can have multiple storage modules with a display 300 attached to one module and the remaining modules having a blank plate. The user can remove the display 300 from a first module, remove a blank plate from a second module and exchange the display 300 and blank plate between modules so that the first module has the blank plate and the second module has the display 300.

The user connects the display 300 to the module by aligning the tabs 320 with attachment apertures in the module, popping the display 300 into place and connecting a module bus connector to the display bus connector 322, aligning the bus with the bus connector 322.

The capability to move the display 300 to various positions in a storage library improves ergonomics of moving data cartridges to and from the library. In addition to this improvement in ergonomics and facility of library usage, the illustrative system includes a capability to detect movement of the display 300 and to reconfigure the library accordingly. One configuration aspect of a data library is the mailslot. The illustrative system has a capability to detect movement of the display 300 and to automatically reconfigure the mailslot in response to the movement. The illustrative storage system has a capability to move the mailslot to follow motion of the display.

Figure 4:
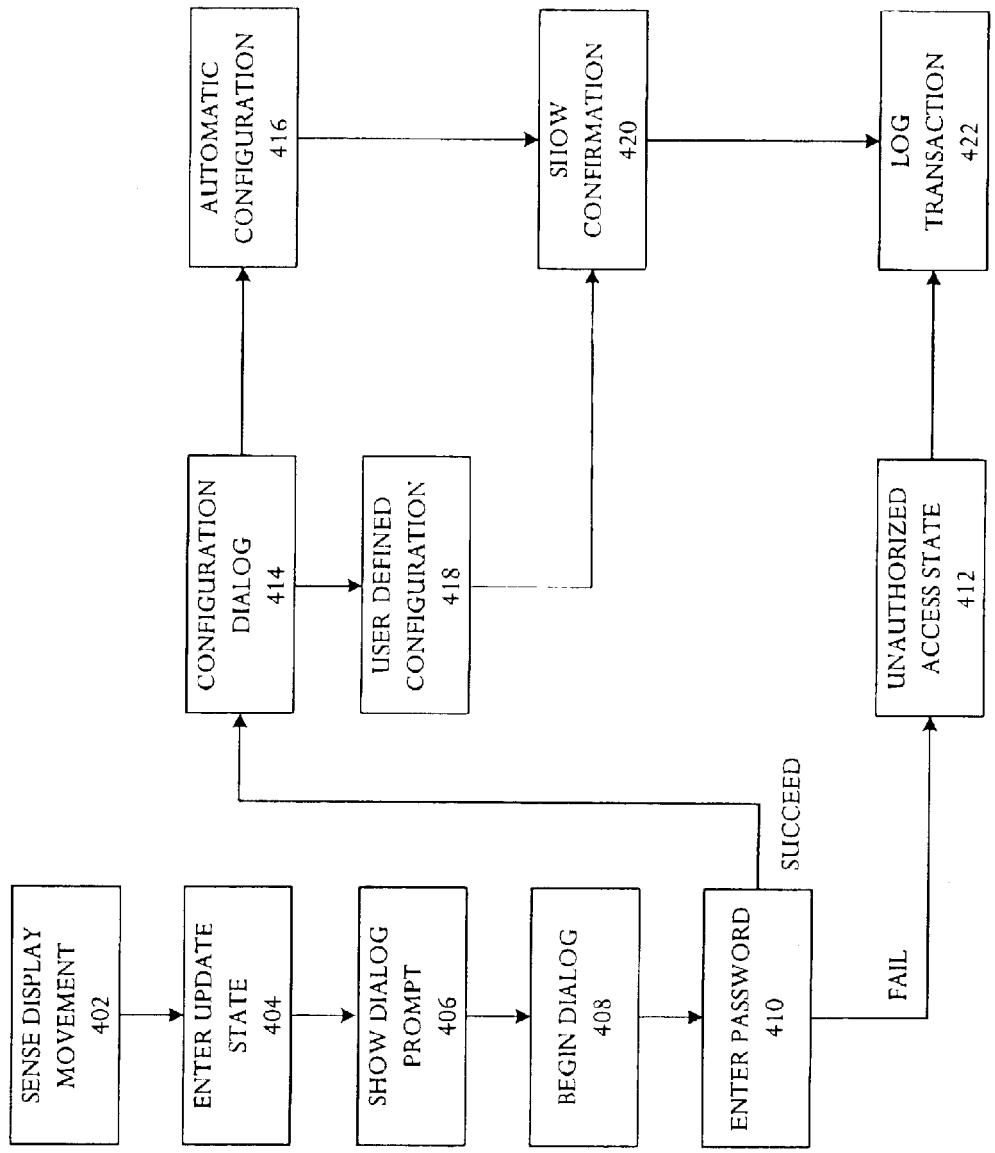
FIG. 4 is a schematic flow chart depicts an embodiment for reconfiguring a mailslot in response to a transfer in position of the display.

Referring to FIG. 4, a schematic flow chart depicts an embodiment for reconfiguring a mailslot in response to a transfer in position of the display. Display movement triggers reconfiguration of the mailslot. Typically, software executes on a controller that manages library operations. The software generally executes in a background process, awaiting input signals or timing interrupts. The background process senses movement of the display 402. For example, the front panel display typically loses power upon detachment and is reactivated upon reattachment to the same or other storage module. The system can detect movement of the display using various techniques and sensors. For example, the front panel display can be connected to a bus that communicates throughout the library. In one example, the bus may be an I$^2$C bus. Connection to the bus may generate an interrupt or event that is detected by the process so that the bus can operate as a sensor for detecting connection of the front panel display. In other embodiments, disconnection of the display from the bus may also or otherwise generate an interrupt or event. Some embodiments may generate an interrupt or event if the display is moved from one module to a different module.

In other embodiments, other types of sensors such as switches, optical detectors, and the like, may be used to detect connection and/or disconnection of the front panel.

In response to the sensed movement, the process enters a new state or condition indicative that the display had moved 404. In the new state, the process offers a prompt 406 to begin a dialog with a user or administrator. When the user or administrator answers the prompt, the process begins a dialog 408 to begin configuration. Typically, an initial or early request in the dialog is a request to enter a password 410 since configuration is often password-protected. If the user does not correctly enter the password, the process enters an unauthorized access state 412. In one example, the unauthorized access state 412 the library remains configured in the previous state with no changes, and the display shows an error indication. The mailslot enables an authorized user to move one or more cartridges to an area that allows access to the cartridge(s), a procedure that typically is limited to those with authority and permission. Accordingly, movement of the display alone is typically made insufficient to change configuration.

Upon entering of the password, the process and user enter a dialog to redefine the configuration 414. The dialog establishes that the user desires library reconfiguration and sets parameters including magazine size. The dialog can inquire whether the user desires automatic mailslot configuration 416. In automatic configuration, the system reconfigures the mailslot as the same as the current configuration except moves the mailslot to the same magazine or magazines in the new storage module at which the display was moved.

If automatic reconfiguration is not desired, the process proceeds with a dialog for user-defined reconfiguration 418. The dialog may include a message to remind the user to check storage slot and mailslot configurations in backup software. The dialog may further include a description of prerequisites for mailslot configuration and a request to verify compliance with the prerequisites. The display typically will indicate the current mailslot setting including identification of the storage module and magazine or magazines at which the mailslot is located, and the number of mailslots. The user can enter any configuration parameters and enable reconfiguration.

Whether configuration is automatic or user-defined, the process displays 420 either a confirmation screen or an error indication screen showing success or failure. The screen includes a reminder to reconfigure backup software. Background software is reconfigured to reflect the mailslot setting and assist tracking of cartridge exchanges and current location of cartridges. Backup software verification supports and reflects the selected mailslot configuration.

Accordingly, in response to display movement, the process changes system state and initiates a front panel configuration menu that facilitates mailslot configuration. The manual process of mailslot configuration, triggering reconfiguration by pressing of a selection key on the front panel display, can be maintained.

The process then can log the transaction 422 including recording of the display movement and/or aspects of the reconfiguration including success, failure, and indication of unauthorized access in a library event log.

Figure 5:
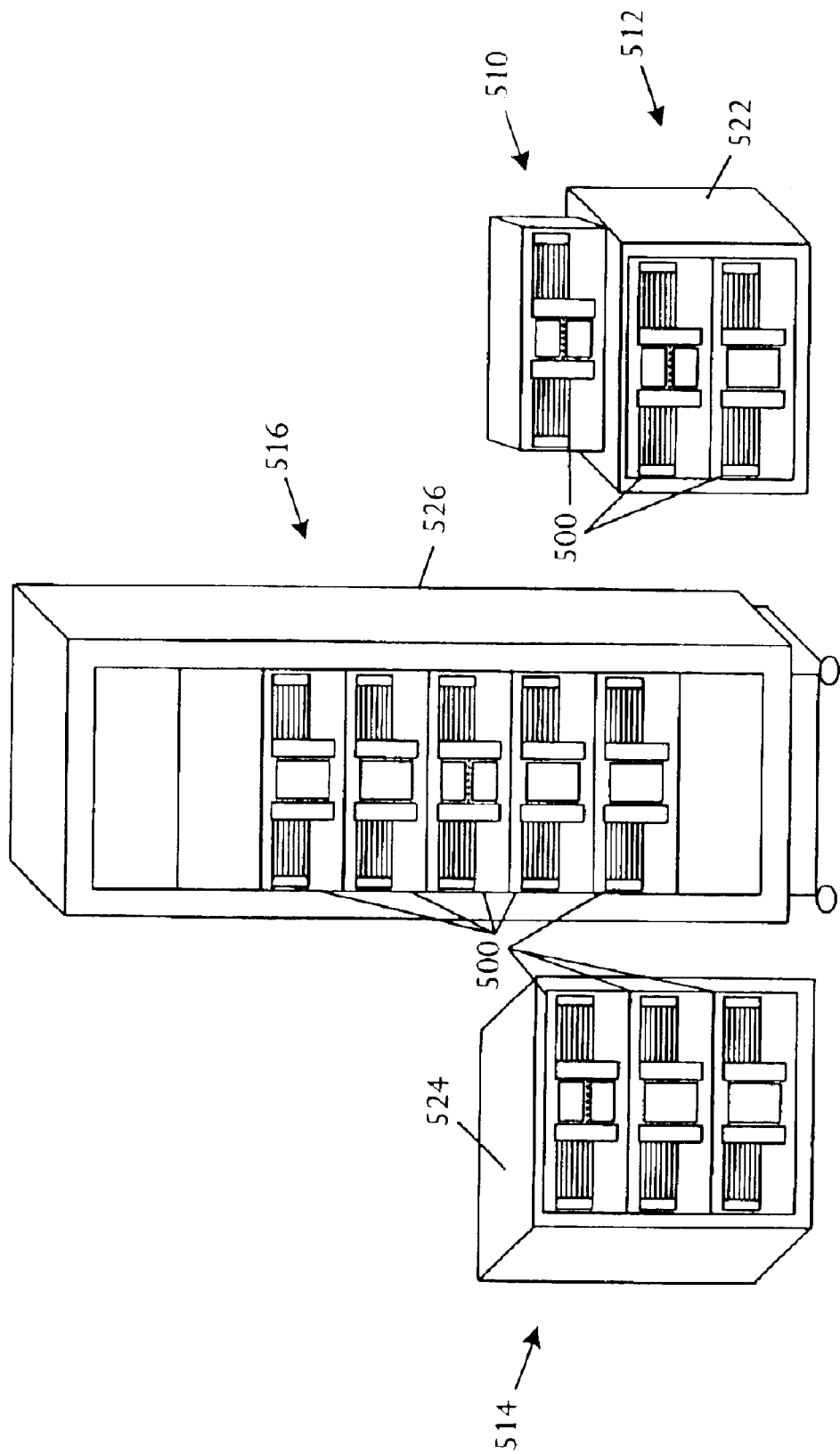
FIG. 5 is a pictorial diagram illustrating several examples of media storage library systems of various sizes and configurations.

Referring to FIG. 5, a pictorial diagram illustrates several examples 510, 512, 514, and 516 of media storage library systems of various sizes and configurations. Connection of a display to the library can initiate reconfiguration of the mailslot no matter what system size and configuration. A system is upgradeable and scaleable to allow organizations to increase storage capacity, throughput, and availability without precisely planning the rate of growth. The media storage library system 510 with a single media storage module 500 has a minimum storage capacity in the illustrative embodiment. Other media storage library systems 512 and 514 respectively have cabinets 522 and 524 that are capable of holding two and three media storage modules 500. A large capacity cabinet 526 can hold up to eight media storage modules 500 in a large capacity media storage library system 516. Other systems may have different sizes, geometry's, and configurations.

Figure 6:
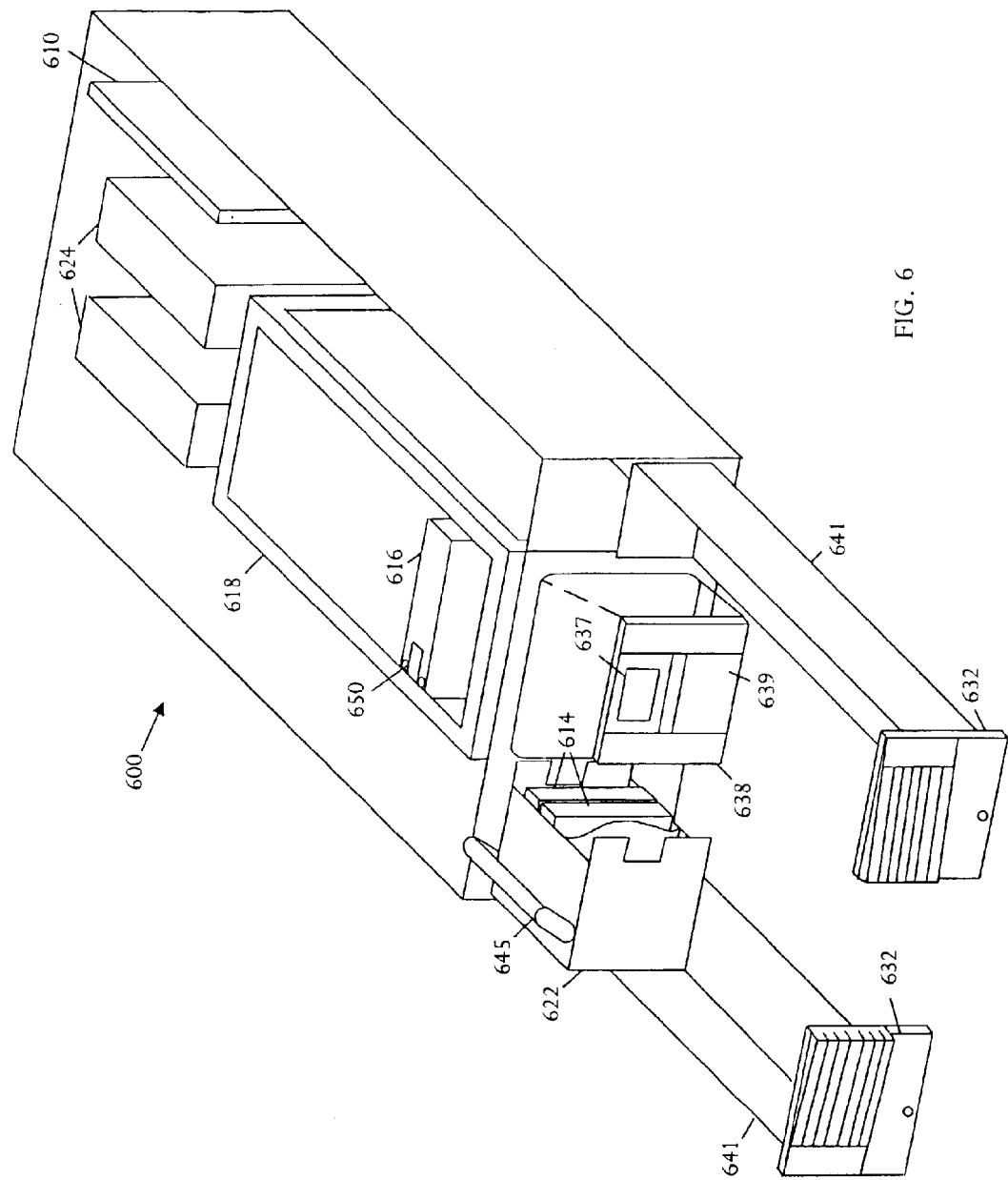
FIG. 6 is a schematic three-dimensional pictorial diagram showing an example of a media storage module that can be used in a media storage library system.

Referring to FIG. 6, a schematic pictorial diagram shows an example of a media storage module 600, one or more of which can be used in a media storage library system to store and retrieve data cartridges 614 and to read and write data onto to data cartridges 614. An operator can enter, withdraw, and substitute data cartridges 614 from the media storage library system. The media storage module 600 utilizes a controller 610 to control various operations including movement of robotics, insertion and withdrawal of media cartridges from storage slots and media drives, management of the front panel display, and other functions.

The controller 610 can control mailslot configuration, either manually by instructions entered via the front panel 638 or automatically by user connection of the front panel 638 to a particular module.

The illustrative media storage module 600 comprises a cartridge engaging assembly 616 that is sometimes termed a "picker" that is moveably mounted to a guide frame 618 contained within the media storage module 600. A user may control the picker 616 to place a data cartridge 614 into a cartridge magazine 622 or remove a data cartridge 614 from a cartridge magazine 622. The media storage module 600 typically can store a plurality of cartridge magazines 622. The media storage module 600 also comprises one or more cartridge read/write devices 624 that can perform read and write access of a data cartridge 614. The data cartridges 614 may be contained within one or more different types of cartridge receiving devices such as one or more cartridge magazines 622 and one or more cartridge read/write devices 624. In the illustrative embodiment, the various cartridge-receiving devices may be mounted around the guide frame 618 in a suitable configuration. In the illustrative embodiment, the cartridge read/write devices 624 are mounted adjacent the rear portion of the guide frame 618 and the cartridge magazines 622 are mounted at opposing side portions of the guide frame 618. Other arrangements are possible.

In the illustrative media storage library system, a user can access data cartridges 614 via magazine access or mailslot access. In either case, the user accesses the data cartridges 614 through a door 632 on a front panel 638. The illustrative media storage module 600 has two doors 632 on adjacent sides of a window on the front panel 638. The window may be a display panel window 637 or a viewing window 639. The cartridge magazines 622 are held within media drawers 641 on opposite sides of the guide frame 618 that are accessible when the doors 632 are open.

Figure 7:
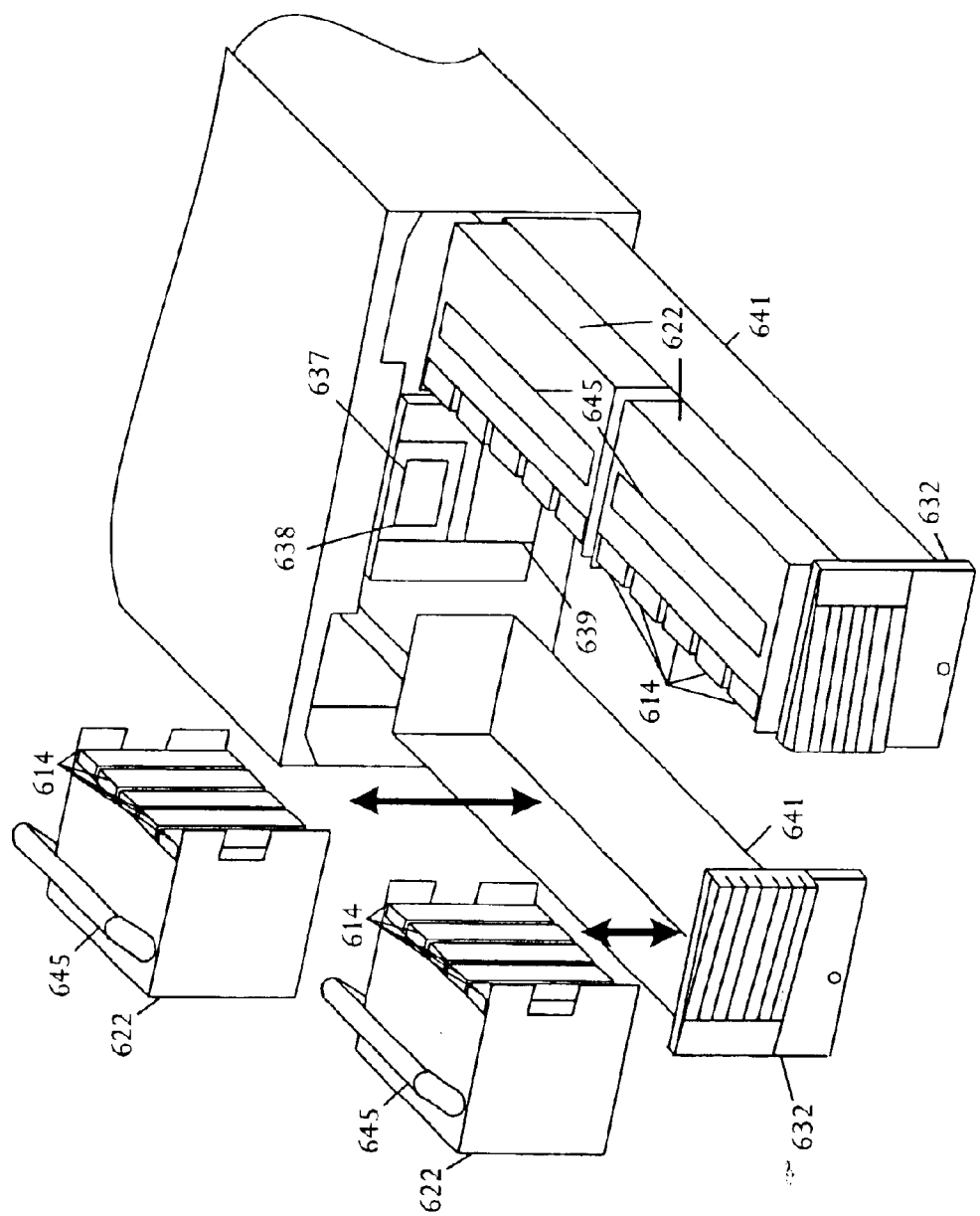
FIG. 7 is a schematic three-dimensional pictorial diagram showing an example of a media storage module that can be used in a media storage library system.

In a magazine access operation, a user actuates buttons on a menu displayed on the display panel window 637 to unlock one or more doors, then draw out the unlocked drawer(s) to access cartridge magazines 622 and data cartridges 614 as shown in FIG. 7. In some applications, a media drawer 641 may be key-locked so that the user unlocks the media drawer 641. The user removes a cartridge magazine 622 by lifting vertically with a magazine handle 645, and removes a data cartridge 614 by lifting from the cartridge magazine 622. The user may insert the same or another data cartridge 614 back into the cartridge magazine 622. In some embodiments, the media drawers 641 move in and out of the media storage module 600 under the power of a drawer transport mechanism 650 as controlled by buttons on the display panel window 637. In other embodiments, the drawers can be manually removed and inserted via sliding drawers.

In a mailslot access operation, a user actuates buttons on the menu displayed on the display panel window 637 to show a "mailslot access" screen, displaying a message indicating the number of data cartridges 614 in the mailslot and the procedure for opening the appropriate door 632. Actuation of a "open drawer" button causes the media drawer 641 to open to the number of storage slots that have been configured for the mailslot. The user may enter, withdraw, or replace data cartridges 614 in the mailslot, then close the media drawer 641. The media storage library system automatically detects the closure, locks the media drawer 641, and initiates an inventory check.

The guide frame 618 supports a transport assembly 650 that engages the picker 616 and guides the picker 616 contiguously along the opposing sides and back portion of the guide frame 618. The picker 616 mounts to the transport assembly 650 and is guided by the transport assembly 650 so that the picker 616 may access the data cartridges 614 contained in the cartridge magazines 622 and the cartridge read/write devices 624. Accordingly, the picker 616 may be controlled to engage a data cartridge 614 contained in a magazine on either of the opposing sides, remove the cartridge, move the cartridge to a position at the rear of the guide frame 618, and insert the cartridge into a cartridge read/write devices 624. Similarly, the picker 616 may remove a data cartridge 614 from a cartridge read/write device 624 and insert the data cartridge 614 into a magazine. Similarly, the picker 616 may move a data cartridge 614 from one position in a magazine to another position in the same magazine or to another magazine. The picker 616 may move in either clockwise or counterclockwise directions along the guide frame 618.

In normal operation, the doors 632 and media drawers 641 are locked, and a user can access a selected data cartridge 614 either locally from the display panel window 637 or via commands from a controller 610 or other suitable processor. The controller 610 may be a local controller connected to the media storage library system or a remote controller accessing via a network. The picker 616 can access all data cartridges 614 contained within the media storage module 600 and within a media storage library system with multiple media storage modules 600. If a user desires to remove a data cartridge 614 from a cartridge read/write device 624, for example for replacement, the user can control the picker 616 to move the cartridge from the cartridge read/write device 624 to a cartridge magazine 622. For magazine access, the user can move the cartridge to a selected media drawer 641. For mailslot access, the user moves the cartridge to a magazine and location within the magazine that is configured as the mailslot. When the cartridge is appropriately positioned, the user can access the cartridge by magazine access or mailslot access for removal or replacement.

Figure 8:
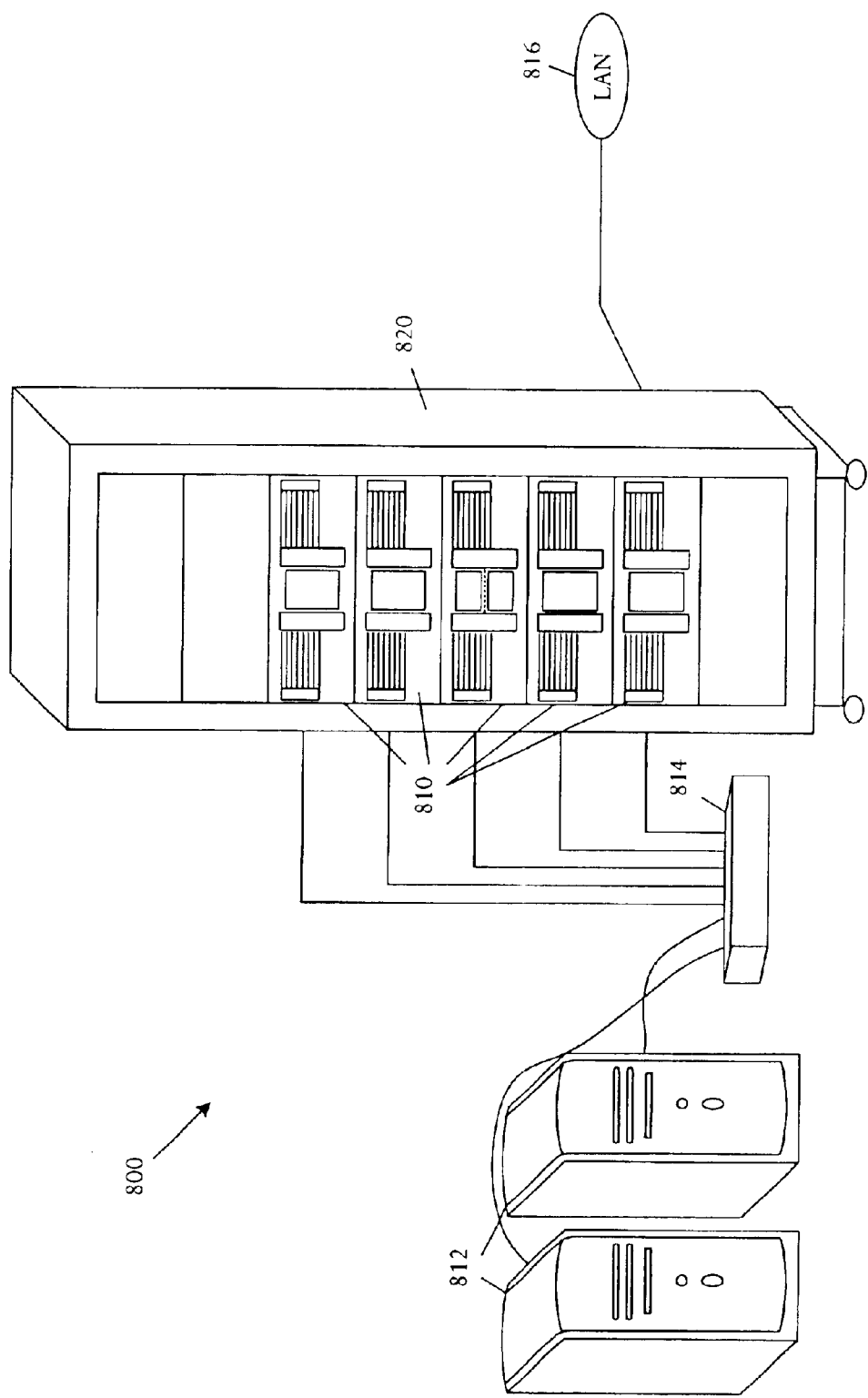
FIG. 8 is a three-dimensional pictorial diagram that shows an example of a multiple-module media storage library system.

Referring to FIG. 8, a three-dimensional pictorial diagram shows an example of a multiple-module media storage library system 800. The illustrative media storage library system 800 has a large capacity cabinet 820 that can hold multiple media storage modules 810 in a large capacity media storage library system 800. The media storage library system 800 comprises, in addition to the cabinet 820 and the multiple media storage modules 810, one or more host processors 812 that are connected to the cabinet 820 via a hub or switch 814. The media storage library system 800 may also include a remote management card local area network (LAN) connection 816 for remote access and storage of data. The hub or switch 814 and the LAN connection 816 are connected to the media storage modules 810 in the cabinet 820 by any suitable interface, such as a small computer systems interface (SCSI). A host processor 812 can operate as a system controller or another suitable processor for controlling and managing testing and configuration operations of the media storage library system 800.

A controller capable of executing processes including mailslot configuration and handling, and automatic mailslot configuration in response to front panel display movement can reside in any media storage module 810, in the cabinet 820, or external to the cabinet 820, for example in a host processor 812 or hub 814.

Although the particular described system includes a sensor for sensing connection of the front panel to a storage module in the form of the interrupt-generating capability of the bus on connection of a bus connector, other sensors are suitable. Other sensors may include electromechanical switches, mechanical switches, optical detectors, electrical signal detectors such as impedance, current, and voltage detectors, and the like. Although, the described system is a tape library, other types of storage devices may be used including tape drives, disk drives, tape libraries, magnetic disk libraries, and the like.

What is claimed is:

1. A modular storage system comprising:
   one or more storage modules, the individual storage modules having one or more magazines that can hold a plurality of storage cartridges;
   a moveable display capable of coupling to a storage module;
   a sensor capable of detecting display movement; and
   a controller that responds to detected display movement by reconfiguring a state of the modular storage system.

2. A storage system according to claim 1 further comprising:
   a process executable by the controller capable of managing one or more storage slots in a storage module of the one or more storage modules as a mailslot that controls access to the storage cartridges.

3. A storage system according to claim 1 further comprising:
   a process executable by the controller and capable of:
      managing one or more storage slots in a storage module of the one or more storage modules as a mailslot that controls access to the storage cartridges;
      configuring the mailslot; and
      initiating mailslot configuration in response to the detected display movement.

4. A storage system according to claim 1 further comprising:
   a process executable by the controller and capable of:
      managing one or more storage slots in a storage module of the one or more storage modules as a mailslot that controls access to the storage cartridges;
      configuring the mailslot; and
      automatically reconfiguring the mailslot to reside on the module to which the display is moved with the mailslot configuration otherwise matching the previous configuration.

5. A storage system according to claim 1 further comprising:
   a process executable by the controller and capable of:
      managing one or more storage slots in a storage module of the one or more storage modules as a mailslot that controls access to the storage cartridges;
      configuring the mailslot; and
      automatically requesting a user dialog to reconfigure the mailslot.

6. A storage system according to claim 1 further comprising:
   a process executable by the controller and capable of:
      managing one or more storage slots in a storage module of the one or more storage modules as a mailslot that controls access to the storage cartridges;

managing password access to mailslot configuration; configuring the mailslot; and automatically reconfiguring the mailslot to reside on the module to which the display is moved with the mailslot configuration otherwise matching the previous configuration.

7. A storage system according to claim 1 further comprising:

a process executable by the controller and capable of:

managing one or more storage slots in a storage module of the one or more storage modules as a mailslot that controls access to the storage cartridges;

managing password access to mailslot configuration, configuring the mailslot; and automatically requesting a user dialog to reconfigure the mailslot.

8. A storage system according to claim 1 further comprising:

a bus coupled to the one or more storage modules and capable of coupling to the display; wherein the sensor is an interrupt or trap handler that detects connection or disconnection of the display to or from the bus, respectively.

9. A storage system according to claim 1 wherein:

the storage modules are capable of storing data in data cartridges selected from among one or more of magnetic disk, magnetic tape, and optical disk.

10. A storage system comprising:

one or more storage modules, the individual storage modules having one or more magazines that can hold a plurality of storage cartridges;

a display capable of detachment and attachment to the one or more storage modules; and a controller capable of managing one or more storage slots in a storage module of the one or more storage modules as a mailslot that controls access to the storage cartridges, and capable of responding to a change in display attachment by initiating mailslot configuration.

11. A storage system according to claim 10 further comprising:

a process executable on the controller that responds to a change in display attachment selected from among one or more of display attachment, display detachment, and display detachment and attachment to a different storage module.

12. A storage system according to claim 10 further comprising:

a process executable by the controller capable of responding to the change in display attachment by automatically reconfiguring the mailslot to reside on the module to which the display is moved with the mailslot configuration otherwise matching the previous configuration.

13. A storage system according to claim 10 further comprising:

a process executable by the controller capable of responding to the change in display attachment by automatically requesting a user dialog to reconfigure the mailslot.

14. A storage system according to claim 10 further comprising:

a process executable by the controller that manages password access to mailslot configuration.

15. A method of operating a storage system comprising:

defining a mailslot as one or more data cartridge slots in a storage module of a multiple-module data storage system;

managing access to data cartridges in the mailslot;

detecting a change in attachment of a display connectable to a storage module in the multiple-module data storage system; and responding to a detected change in display attachment by initiating mailslot reconfiguration.

16. A method according to claim 15 further comprising:

configuring the mailslot to reside in the storage module to which the display is attached in response to attachment of the display.

17. A method according to claim 15 further comprising:

managing password access to mailslot configuration.

18. A method according to claim 15 further comprising:

directing a user dialog in response in response to display attachment.

19. A method according to claim 15 further comprising:

storing a log record of display attachments and detachments, and mailslot configurations.

20. A storage system comprising:

a plurality of modular storage means for storing data, the individual storage means having a plurality of slots for storing a plurality of storage cartridges;

means for defining a mailslot as one or more data cartridge slots in a storage means;

means for managing access to data cartridges in the mailslot;

means for detecting a change in attachment of a display connectable to a storage means in the multiple-module data storage system;

means for responding to a detected change in display attachment by initiating mailslot reconfiguration; and means for selectively configuring the mailslot to reside in the storage means to which the display is attached in response to attachment of the display, or alternatively configuring the mailslot according to a user dialog.

* * * * *

UNITED STATES PATENT AND TRADEMARK OFFICE
CERTIFICATE OF CORRECTION

| | | |
|---|---|---|
| PATENT NO. | : 6,917,993 B2 | Page 1 of 1 |
| APPLICATION NO. | : 10/445072 | |
| DATED | : July 12, 2005 | |
| INVENTOR(S) | : Kristianne Emma Johnson et al. | |

It is certified that error appears in the above-identified patent and that said Letters Patent is hereby corrected as shown below:

In column 12, line 30, in Claim 18, after "dialog in response" delete "in response".

Signed and Sealed this

Fourth Day of August, 2009

JOHN DOLL
*Acting Director of the United States Patent and Trademark Office*